United States Patent [19]

Stumpp

[11] 3,983,849

[45] Oct. 5, 1976

[54] FUEL INJECTION SYSTEM

[75] Inventor: Gerhard Stumpp, Stuttgart, Germany

[73] Assignee: Robert Bosch G.m.b.H., Stuttgart, Germany

[22] Filed: June 24, 1975

[21] Appl. No.: 589,856

[30] Foreign Application Priority Data
July 25, 1974 Germany............................ 2435840

[52] U.S. Cl...................... 123/32 SP; 123/139 AW
[51] Int. Cl.² ........................................ F02B 19/10
[58] Field of Search ...... 123/139 AW, 32 ST, 32 SP

[56] References Cited
UNITED STATES PATENTS 3,682,146   8/1972   Mozokhin ...................... 123/32 ST
3,894,523   7/1975   Stumpp ....................... 123/139 AW Primary Examiner—Charles J. Myhre
Assistant Examiner—Ronald B. Cox
Attorney, Agent, or Firm—Edwin E. Greigg

[57] ABSTRACT

A fuel injection system for stratified-charge engines includes a fuel metering valve assembly controlled by an air flow sensor. The restoring force on the movable plunger in the fuel metering assembly may be varied in dependence on load by a differential pressure valve whose bias is changed by a cam-follower which cooperates with a gas-pedal linked cam. The system may also include a throttle bypass also controlled by a cam. The system may further include separate fuel injection valves for each main combustion chamber, fed by a fuel distributor mechanism.

11 Claims, 2 Drawing Figures

3,983,849

FUEL INJECTION SYSTEM

BACKGROUND OF THE INVENTION

The present invention relates to a fuel injection system for an externally ignited stratified-charge internal combustion engine comprising engine cylinders having a precombustion chamber and a main combustion chamber. The engine also comprises an induction tube in which a sensor element and an arbitrarily operable throttle butterfly valve are disposed in series.

In the case of known stratified-charge combustion engines of this type, a relatively rich fuel-air mixture is ignited in a precombustion chamber. The igniting flame which shoots out of the precombustion chamber is capable of igniting the relatively lean fuel-air mixture in a main combustion chamber and initiates an extended combustion process therein. Carburetors are used to supply fuel to the precombustion and main combustion chambers.

OBJECT AND SUMMARY OF THE INVENTION

It is a principal object of the present invention to provide a fuel injection system for use with stratified-charge internal combustion engines having precombustion and main combustion chambers which can be produced at low cost and which makes possible very accurate fuel metering, thereby eliminating toxic exhaust gas components.

According to the invention, this object is achieved in that the sensor element is moved by and in proportion to the quantity of air flowing through the induction tube against a restoring force. In the course of its excursion, the sensor element displaces a control plunger of a fuel metering valve assembly which meters out fuel in proportion to the air quantity. Fuel metering takes place while a constant pressure difference prevails across the metering valve. A portion of the total metered fuel quantity is injected intermittently through injection valves into each precombustion chamber by an injection pump operated at the engine r.p.m. in dependence on the position of the butterfly valve. The remaining portion of the total metered quantity of fuel, which is intended for the main combustion chambers, is injected continuously into the induction tube downstream of the butterfly valve.

An advantageous feature of the invention is the placement of a differential pressure valve in the fuel flow downstream of the metering valve. The differential pressure valve is in the form of a flat-seat valve, and its movable member is a diaphragm which separates a chamber located in the fuel line flow upstream of the metering point from another chamber in the path of the fuel flow downstream of the metering point. The latter chamber includes a valve seat cooperating with the diaphragm, and a spring which urges the diaphragm to open the differential pressure valve.

Another advantageous feature of the invention provides that the portion of the total metered fuel quantity intended for the main combustion chambers is injected by a fuel injection valve into the induction tube downstream of the butterfly valve.

A further advantageous feature of the invention provides that the fuel injection pump is a reciprocating piston type pump which has one piston associated with each precombustion chamber. The quantity of supplied fuel is variable by means of an actuating rod which follows a rotatable cam plate in dependence on the angular position of the butterfly valve.

Yet another advantageous feature of the invention provides that the restoring force acting on the sensor element is exerted by engine fuel. This fuel is supplied from the pressure side of a fuel pump through a de-coupling throttle to a control pressure line and the fuel pressure may be changed by at least one pressure control valve as a function of the operating parameters of the engine. For example, one parameter may be the position of the butterfly valve, monitored by means of a cam plate and follower.

A still further feature of the invention provides an air bypass around the butterfly valve. The bypass includes an air valve which is biased in the closing direction by a spring whose tension is variable as a function of the position of the butterfly valve. The air valve in the bypass is closed when the butterfly throttle valve is in the idling position.

The invention further provides a differential pressure valve, disposed in the fuel flow upstream of the fuel metering valve. The differential pressure valve is in the form of a flat seat valve whose movable part is a diaphragm which separates a first chamber from a second chamber. The first chamber is disposed in the path of the fuel flow downstream of the metering point and it includes a spring biasing the differential pressure valve in the closing direction. The second chamber is disposed in the path of the fuel flow upstream of the metering point and it contains a valve seat which cooperates with the diaphragm, permitting varying amounts of fuel to flow back to the fuel tank. The tension of biasing spring in the differential pressure valve is variable as a function of the position of the butterfly valve.

In a second preferred embodiment of the invention, the fuel injection system includes a fuel distributor mechanism, located downstream of the fuel injection pump, which delivers that portion of the total metered quantity of fuel which is intended for the main combustion chambers to fuel injection valves which inject this fuel into individual branches of the induction tube ahead of the individual main combustion chambers.

Other objects and advantages of the present invention will be more readily apparent from a further consideration of the following detailed description of the drawings illustrating a preferred embodiment of the invention, in which:

DESCRIPTION OF THE PREFERRED EMBODIMENTS

Figure 1:
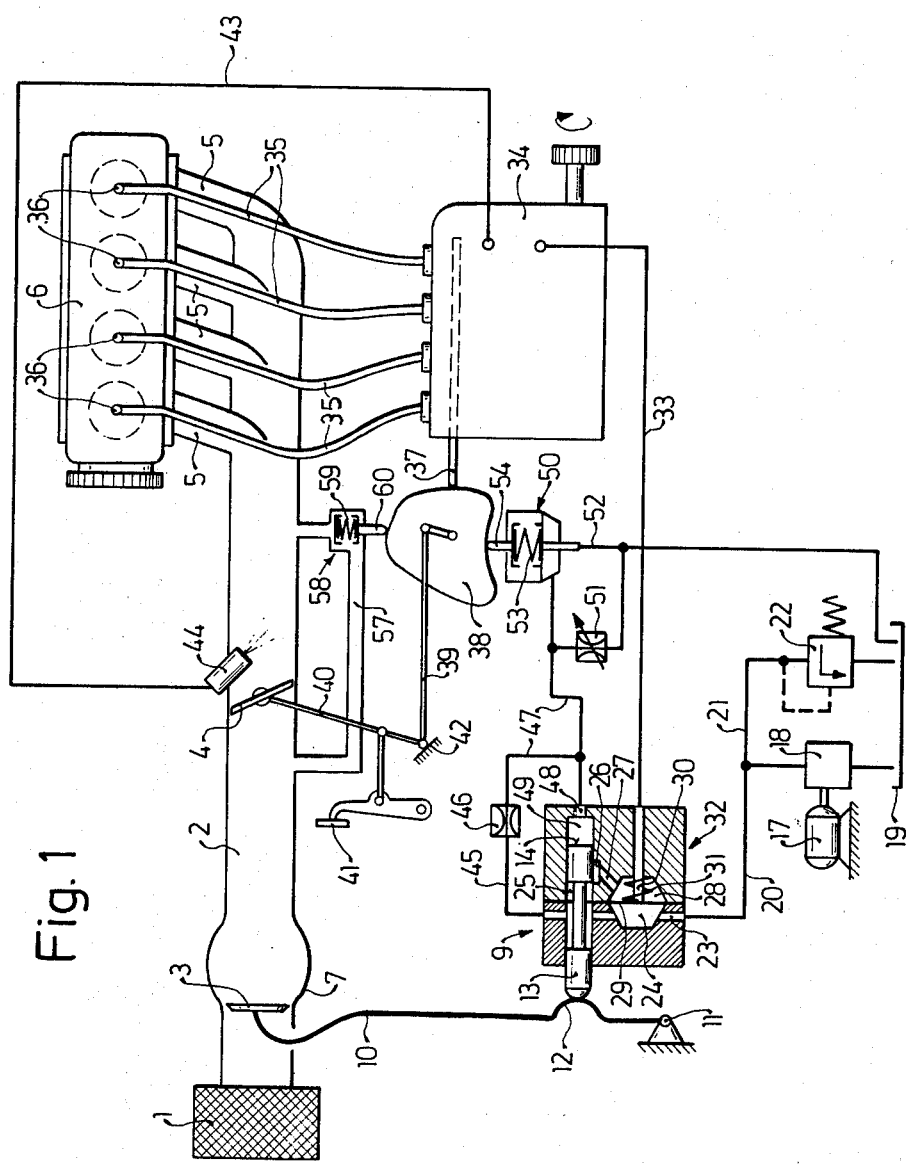
FIG. 1 is a schematic diagram of a first embodiment of the fuel injection system according to the invention.

In the embodiment of the fuel injection system shown in FIG. 1, the combustion air flows through a filter 1 into an induction tube 2 in which an air sensor 3 and an arbitrarily settable butterfly valve 4 are disposed in sequence. The combustion air then flows to the individual branches 5 of the main combustion chambers (not shown) of a stratified-charge internal combustion engine 6. The air sensor 3 comprises a plate, disposed at right angles to the direction of air flow, which moves within a bulbous portion 7 of the induction tube 2 according to an approximately linear function of the air flowing through the induction tube. If the restoring force exerted on the sensor 3 as well as the pressure prevailing upstream of the sensor 3 are both constant, then the pressure prevailing between the air sensor 3 and the butterfly valve 4 also remains constant. The air sensor 3 directly controls a fuel metering and distributor valve assembly 9. The motion of the air sensor 3 is transmitted by a lever 10 pivotably mounted at a pivot point 11. The lever 10 has a nose 12 and, during the pivoting movement of the lever, the nose 12 actuates the movable part of the fuel metering and distributor valve assembly 9, which is in the form of a control plunger 13. The front face 14 of the control plunger 13 which is remote from the nose 12 is exposed to the force of pressurized fluid which produces the restoring force exerted on the air sensor 3.

Fuel is supplied by means of a fuel pump 18 driven by an electric motor 17 which draws fuel from a fuel tank 19 and delivers it through a conduit 20 to the fuel metering and distributor valve assembly 9. From the conduit 20, there extends a conduit 21 in which is disposed a pressure limiting valve 22 which permits fuel to flow back into the fuel tank 19, when the pressure in the fuel conduits becomes excessive.

From the conduit 20, fuel is admitted via a channel 23 and a chamber 24 to an annular groove 25 in the control plunger 13. Dependent upon the position of the control plunger 13, the annular groove 25 opens to a greater or lesser extent control slot 26 which leads through a channel 27 to a chamber 28 which is separated from the chamber 24 by a diaphragm 29. The diaphragm 29 serves as the movable part of a flat-seat valve comprising a fixed valve seat 30, which it is urged to open by a spring 31. The differential pressure valve 32, comprising two chambers 24 and 28 and the diaphragm 29, as well as the fixed valve seat 30 and the spring 31, ensures that the pressure drop across the metering and distributor valve assembly 9 remains substantially constant independently of the overlap as between the annular groove 25 and the control slot 26, i.e., independently of the metered-out quantity of fuel. This ensures that the extent of displacement of the control plunger 13 and the metered out fuel quantity remain proportional to one another.

During a pivoting movement of the lever 10, the air sensor 3 moves within bulbous portion 7 of the induction tube 2 and, as a result, the annular flow cross-section as between the sensor plate and the tube changes in proportion to the displacement of the air sensor 3.

The total quantity of fuel metered out by the metering and distributor valve assembly 9 flows through the differential pressure valve 32 and a conduit 33 into the suction chamber of a fuel injection pump 34 which is embodied as a piston pump, driven at the engine r.p.m. The pump has one working pump piston per engine combustion chamber and it serves to inject a portion of the total metered quantity of fuel intermittently, through injection conduits 35 and by injection valves 36, into each individual precombustion chamber. The quantity of fuel delivered to the injection pump is variable by means of an actuating rod 37 whose tip follows a rotatable cam plate 38 in dependence on the position of the butterfly valve 4. To this end, the cam plate 38 is linked with the butterfly valve 4 by interconnected rods 39,40. The butterfly valve 4 is arbitrarily settable by means of an accelerator pedal 41 and the idling position of the butterfly valve 4 may be limited by a stop 42.

That portion of the total metered quantity of fuel which is intended for the main combustion chambers flows from the suction chamber of the injection pump and is supplied through a main injection conduit 43 to a fuel injection valve 44 which continuously injects fuel into the induction tube 2 downstream of the throttle valve 4.

The fluid which provides the constant restoring force acting on the control plunger 13 is engine fuel. For this purpose, a conduit 45 branches off from the channel 23 and is uncoupled from a control pressure conduit 47 by means of a de-coupling throttle 46. A pressure chamber 49 communicates with the control pressure conduit 47 via a damping throttle 48. The front face 14 of the control plunger 13 projects into the pressure chamber 49.

The pressurized fluid can flow back to the fuel tank 19 without pressure through a conduit 52, after passage through pressure control valves 50 and 51, disposed in the control pressure conduit 47. The pressure of the pressurized fluid producing the restoring force on the control plunger may be varied in dependence on the position of the butterfly valve by means of the pressure control valve 50. To this end, the tension of a spring 53 biasing the pressure control valve 50 in the closing direction is varied via a cam follower element 54 by the cam plate 38 which is rotatable in dependence on the position of the butterfly valve. The pressure control valve 51 makes it possible to control the pressure of the pressurized fluid as a function of other operating parameters of the internal combustion engine such as temperature, pressure, exhaust gas composition and r.p.m.

A bypass 57, leading around the butterfly valve 4, includes an air flow control valve 58. The air flow control valve 58 is biased in the closing direction by a spring 59, the tension of which is variable via a cam follower pin 60 by the cam plate 38 as a function of the position of the butterfly valve. The air flow control valve 58 is closed when the butterfly valve 4 is in the idling position.

The fuel injection system according to the invention operates in the following manner:

When the internal combustion engine 6 is running, fuel is drawn from the fuel tank 19 by the pump 18 driven by the electric motor 17 and is pumped through the fuel supply conduit 20 to the fuel metering and distributor valve assembly 9. At the same time, the internal combustion engine draws air through the induction tube 2 and, as a result, the air flow sensor 3 is displaced from its rest position. In response to the deflection of the air sensor 3, the control plunger 13 is displaced by the lever 10 and thus the flow cross-section of the control slot 26 is increased. The direct connection which exists between the air sensor 3 and the control plunger 13 ensures a constant ratio of the quantity of air to the metered-out fuel quantity provided the characteristics of these two components are sufficiently linear (which is desideratum by itself). In such a case, the fuel-air ratio would be constant for the entire operational range of the engine. However, it is necessary for the fuel-air mixture to be made richer or leaner, depending on the operating conditions of the internal combustion engine, and this is achieved by varying the restoring force acting on the air sensor 3. For this purpose, the control pressure line 47 contains the pressure control valves 50 and 51 which influence the fuel-air ratio by varying the pressure of the pressurized fluid. For example, the pressure control valve 50 may vary the control pressure as a function of the engine load as determined by the position of the butterfly valve 4.

The total quantity of fuel metered-out by the metering valve assembly 9 is divided by the fuel injection pump 34 into a portion intended for the precombustion chambers and another portion intended for the main combustion chambers. The quantity of fuel intended for each precombustion chamber is injected intermittently directly into the precombustion chambers by the fuel injection valves 36. The fuel-air ratio selected for the precombustion chambers is relatively rich, whereas the main combustion chambers are supplied with a relatively lean fuel-air mixture. At full load, the quantity of fuel injected per stroke into the precombustion chambers must be reduced to prevent the entire mixture from becoming too rich due to the increasing quantity of fuel being injected at full load into the main combustion chambers. An excessively rich mixture would lead to the formation of soot. For this purpose, the delivery volume of the injection pump 34 may be varied, by means of the control rod 37 and the cam plate 38, as a function of the position of the butterfly valve 4. The portion of the total metered-out quantity of fuel which is intended for the main combustion chambers flows from the suction chamber of the injection pump 34 through the main injection conduit 43 to an injection valve 44 by means of which the fuel is continuously injected into the induction tube downstream of the butterfly valve 4.

The induction tube pressure downstream of the butterfly valve 4 can be varied in dependence on the position of the butterfly valve, i.e., as a function of the engine r.p.m., by means of the bypass 57 around the butterfly valve 4; the cross-section of the bypass 57 being variable by means of the air flow control valve 58. When the butterfly valve 4 is in the idling position, determined by the stop 42, the air flow valve 58 is closed. When the gas pedal is depressed, the butterfly valve 4 is opened and the tension of the spring 59 is reduced in dependence on the position of the butterfly valve. As a result, the induction tube pressure is controlled via the bypass 57 in dependence on the position of the butterfly valve and independently of the engine r.p.m.

Figure 2:
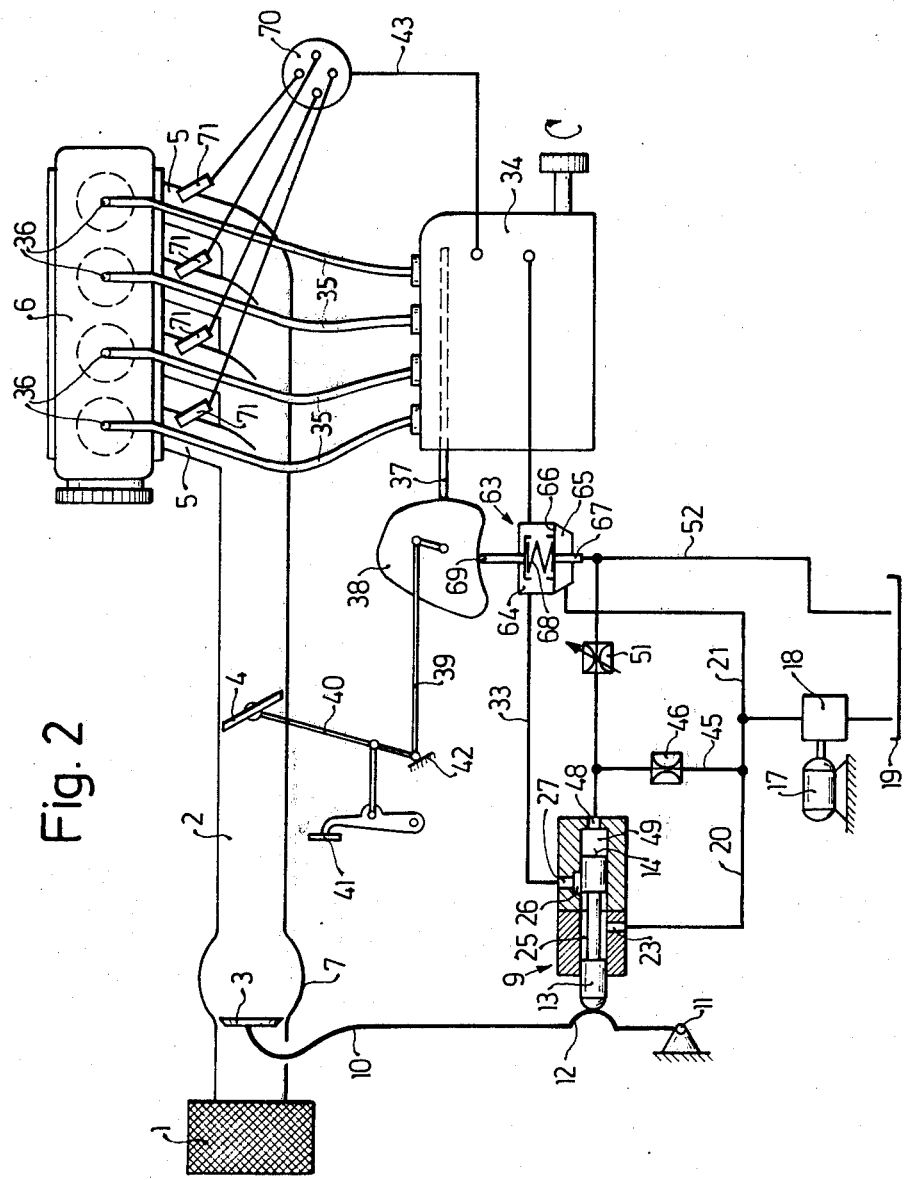
FIG. 2 is a schematic diagram of a second embodiment of the fuel injection system according to the invention.

In a second preferred embodiment of the fuel injection system, according to FIG. 2, the fuel-air ratio for the entire engine may be varied by varying the differential pressure across the metering valve 9 as a function of the position of the butterfly valve. For this purpose, one chamber 64 of a differential pressure valve 63 is disposed in the path of the fuel flow downstream of the metering valve assembly 9. The other chamber 65 is exposed to the pressure prevailing upstream of the metering valve 9 through the conduit 21. The chambers 64 and 65 are separated by a movable diaphragm 66 which cooperates with a fixed valve seat 67 located in the chamber 65. The fuel is able to flow back to the fuel tank via the fixed valve seat 67 and through the return line 52. The differential pressure valve 63 is urged to close by a spring 68, disposed in the chamber 64. The tension of the spring 68 may be varied via a cam follower element 69 by the cam plate 38, as a function of the position of the butterfly valve 4.

As shown in FIG. 2, that portion of the total metered-out quantity of fuel which is intended for the main combustion chambers can be supplied by the fuel injection pump 34 through the main injection conduit 43 to a fuel distributor 70 which is known per se and which feeds the injection valves 71. These injection valves 71 are disposed in the induction tube branches 5 directly ahead of the intake valves of the main combustion chambers.

The fuel injection system according to the invention meters out the total quantity of fuel as a function of the quantity of air drawn into the internal combustion engine. Part of this fuel is injected into the precombustion chambers, intermittently and well-timed, in dependence on the load of the engine. The remaining part of the fuel is supplied to the main combustion chambers in a variable manner in dependence on the load. In addition, the volume of induced air is throttled to avoid exceeding the lean-running limit of the engine. As a result, the engine produces an exhaust gas with a minimum amount of toxic components.

The fuel may also be metered out by electromagnetic injection valves controlled by an electronic control device into which are fed electrical signals representative of the operating parameters of the internal combustion engine.

What is claimed is:

1. A fuel injection system for use with a mixture-compressing, externally ignited, stratified-charge internal combustion engine which has an air induction tube and a fuel supply pump and each of whose cylinders includes a precombustion chamber and a main combustion chamber, comprising, in combination:
   A. an air flow measuring sensor, disposed within the induction tube of the engine;
   B. an arbitrarily actuatable throttle valve, disposed within the induction tube of the engine;
   C. means for exerting a restoring force on said air flow measuring sensor;
   D. fuel metering valve means, including a movable control plunger actuated by said air flow measuring sensor;
   E. means for controlling the pressure drop across said fuel metering valve means;
   F. a fuel injection pump driven by the engine and supplied with fuel by said fuel metering valve means;
   G. at least one fuel injection valve associated with each of said pre-combustion chambers and supplied intermittently with fuel by said fuel injection pump; and
   H. means for sensing the position of said throttle valve and for influencing said fuel injection pump so as to vary the amount of fuel supplied by said fuel injection pump to said fuel injection valves associated with said pre-combustion chambers.

2. A fuel injection system as defined in claim 1, wherein said means for controlling the pressure drop across said fuel metering valve means is a flat-seat differential pressure valve, having two chambers separated by a diaphragm, the first of said two chambers being traversed by fuel upstream of said fuel metering valve means and the second of said two chambers being traversed by fuel downstream of said fuel metering valve means and including a valve seat which cooperates with said diaphragm and a spring which urges said diaphragm away from said valve seat.

3. A fuel injection system as defined in claim 2, further including:
   I. fuel injection valve means, located in the air induction tube of the engine downstream of said throttle valve and connected to said fuel injection pump to effect continuous delivery of fuel into the induction tube of the engine.

4. A fuel injection system as defined in claim 1, wherein said fuel injection pump is a piston pump, including one piston associated with each pre-combustion chamber and including a control rod, and wherein said means for sensing the position of said throttle valve includes movable cam plate means, linked to said throttle valve for rotation thereby; whereby said control rod follows said cam plate means and controls fuel delivery in dependence on the position of said throttle valve.

5. A fuel injection system as defined in claim 1, wherein said movable control plunger is actuated by pressurized fuel supplied by said fuel supply pump through a control pressure line which includes a decoupling throttle, the fuel injection system further comprising:
J. pressure control valve means connected to said control pressure line for setting the pressure prevailing therein.

6. A fuel injection system as defined in claim 5, wherein said means for sensing the position of said throttle valve includes movable cam plate means, linked to said throttle valve for rotation thereby, said pressure control valve means being operatively coupled to said movable cam plate means; whereby said pressure control valve is operated in dependence on the position of said throttle valve.

7. A fuel injection system as defined in claim 1, further comprising:
K. a bypass line connected to the induction tube between locations upstream and downstream, respectively, of said throttle valve, said bypass line including an air flow control valve with a control spring whose closing force is variable in dependence on the position of said throttle valve.

8. A fuel injection system as defined in claim 7, wherein said throttle valve and said air flow control valve are so linked that said air flow control valve obturates said bypass when said throttle valve is in the position corresponding to the engine's idling r.p.m.

9. A fuel injection system as defined in claim 1, wherein said means for controlling the pressure drop across said fuel metering valve means is a flat-seat differential pressure valve, having two chambers separated by a diaphragm, the first of said two chambers being traversed by fuel upstream of said fuel metering valve means and including a valve seat which cooperates with said diaphragm, the second of said two chambers being traversed by fuel downstream of said fuel metering valve means and including a valve control spring which urges said diaphragm toward said valve seat.

10. A fuel injection system as defined in claim 9, including means for controlling the tension of said valve control spring in dependence on the position of said throttle valve.

11. A fuel injection system as defined in claim 1, further comprising:
L. fuel distributor means, connected downstream of said fuel injection pump; and
M. at least one fuel injection valve located in an induction tube section ahead of each one of said main combustion chambers; whereby the fuel intended for the main combustion chambers is distributed by said fuel distributor means and is delivered to said fuel injection valves for injection into the induction tube sections ahead of the individual main combustion chambers.

* * * * *